United States Patent [19]

Hinds

[11] Patent Number: 4,499,886

[45] Date of Patent: Feb. 19, 1985

[54] DIESEL FUEL HEATER

[76] Inventor: Kenneth W. Hinds, Rte. 4, Box 474, Springdale, Ark. 72764

[21] Appl. No.: 386,887

[22] Filed: Jun. 10, 1982

[51] Int. Cl.³ ............................................. F02M 31/00
[52] U.S. Cl. .................................. 123/557; 123/514; 123/516
[58] Field of Search ................ 123/514, 516, 557; 165/51, 52

[56] References Cited

U.S. PATENT DOCUMENTS

| 2,599,699 | 6/1952 | Dilworth | 123/514 |
|---|---|---|---|
| 3,110,296 | 11/1963 | Lundi | 123/557 |
| 4,169,442 | 10/1979 | Fossum | 123/546 |
| 4,326,492 | 4/1982 | Leibrand | 123/557 |
| 4,343,283 | 8/1982 | Shepherd | 123/557 |
| 4,377,149 | 3/1983 | Naylor | 123/557 |
| 4,380,987 | 4/1983 | Crain | 123/514 |
| 4,385,615 | 5/1983 | Keane | 123/514 |

Primary Examiner—Ronald H. Lazarus
Attorney, Agent, or Firm—Head, Johnson & Stevenson

[57] ABSTRACT

A cannister type diesel fuel heater that readily bolts on to a conventional diesel tractor comprising a closed container having two separate heat exchanger coil systems within the closed cannister. One coil is adapted to circulate diesel fuel coming from the fuel tank before combustion and the other coil is adapted to circulate excess diesel fuel returning to the fuel tank. By circulating hot crankcase oil from the diesel engine within the cannister in contact with the heat exchanger coils, the diesel fuel is heated before combustion as well as being heated upon return to the fuel tank. Such a system is particularly useful in maintaining the fuel system free of paraffinic deposits as well as improving overall efficiency and fuel mileage.

4 Claims, 4 Drawing Figures

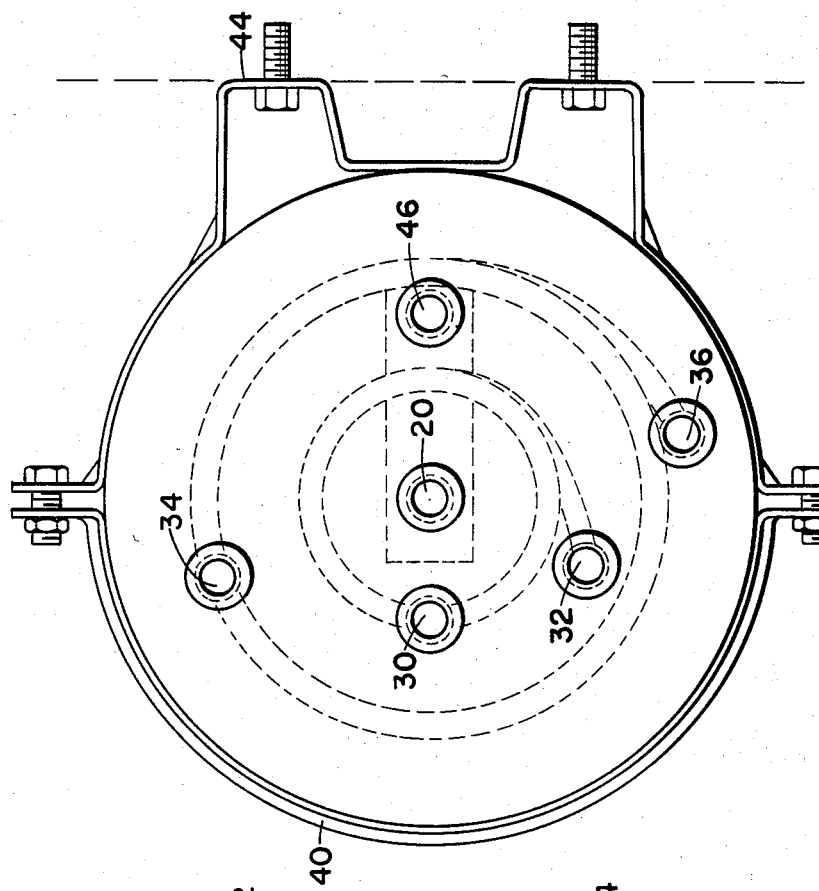
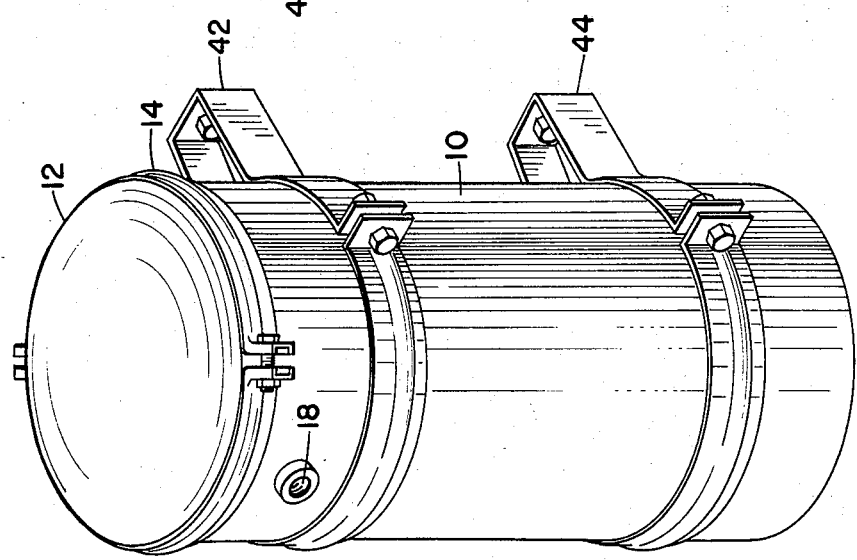
Fig.3
Fig.4

4,499,886

DIESEL FUEL HEATER

BACKGROUND OF THE INVENTION

1. Field of the Invention

This invention relates to heating the diesel fuel in a diesel powered vehicle. More specifically, the invention relates to an apparatus that simultaneously heats the diesel fuel being pumped to the engine as well as the excess fuel recirculating to the fuel tank by liquid/liquid heat exchange with hot crankcase oil.

2. Description of the Prior Art

The basic concept of heating the fuel/air mixture entering an internal combustion engine is generally known in the art. The reason or incentive for heating a gasoline and air mixture before combustion is usually related to increased efficiency and economy associated with improved vaporization of the gasoline droplets. Thus, it is generally known to heat the fuel/air mixture either before, during or after passing through the carburetor. A variety of types of heating devices have historically been suggested and employed including various electrical heaters, equipment to direct combustion exhaust gases through heat exchangers in contact with incoming fuel/air mixture, and equipment that uses hot crankcase oil in a manner similar to the exhaust gases. For example, in U.S. Pat. No. 2,125,216, the fuel/air mixture exiting a carburetor is heated with hot crankcase oil before entering the intake manifold. U.S. Pat. No. 3,016,890 discloses a method of circulating hot oil in the air filter to heat the air entering the carburetor. In U.S. Pat. Nos. 3,916,859 and 4,169,442, hot oil is circulated through a hollow stem of the carburetor throttle valve to prevent icing in the carburetor.

In the case of a diesel engine, it is generally known and an accepted practice to heat either the fuel line, engine or both to assist cold weather starting. This is commonly achieved by plugging in an electric heater to an external electrical source prior to starting. This heating is usually envisioned as being necessary to prevent or inhibit the paraffinic components of the diesel fuel from depositing in the fuel line and injectors, thus clogging the fuel system. However, there is another incentive to heating diesel fuel which has been generally ignored; ie., a controlled warmed source of diesel fuel will allow the engine to perform more efficiently. Thus, a need exists for an inexpensive yet reliable method and apparatus to supply uniformly heated diesel fuel being injected into a diesel engine.

BRIEF DESCRIPTION OF THE DRAWINGS

FIG. 3 is a bottom view of the diesel fuel heater of FIG. 1.

FIG. 4 is an assembled perspective view of the diesel fuel heater of FIG. 1.

SUMMARY OF THE INVENTION

In view of the previous methods and apparatus for heating diesel fuel before combustion, I have discovered an improved method and apparatus for inhibiting the formation of paraffinic deposits and for improving fuel mileage. The apparatus according to the present invention comprises:

(a) a closed container equipped with an oil inlet and an oil outlet and adapted to circulate hot crankcase oil from the engine through the interior of the closed container;

(b) a first heat exchanger means within the closed container attached to a separate inlet and outlet and adapted to circulate diesel fuel coming from the fuel tank and going to the engine in indirect liquid/liquid contact with the hot crankcase oil within the closed container thus heating the fuel before combustion; and (c) a second heat exchanger means within the closed container attached to another separate inlet and outlet and adapted to circulate excess diesel fuel, recycled from the engine and going to the fuel tank in indirect liquid/liquid contact with the hot crankcase oil within the closed container thus heating the fuel being returned to the fuel tank.

Preferably, the first and second heat exchanger means are concentric (vertical) coils of tubing which can be placed in an essentially vertical cannister with removable top lid. A hot oil outlet means can be provided with a vertical tube within the container which rises within the container to a level above the coils and terminates in a means to control the rate of oil flow through the container during operation of the engine.

It is a primary object of the present invention to provide an inexpensive yet reliable apparatus and method for heating the diesel fuel being circulated in the fuel system of a diesel engine. It is a further object that the heating be sufficient to both inhibit paraffinic dropout during cold weather and to allow optimizing the efficiency and fuel mileage of the vehicle. It is a further object that the apparatus be amenable to after market bolt-on type applications for existing diesel tractors and the like. Fulfillment of these objects and the presence and fulfillment of other objects will be apparent upon a complete reading of the specification and claims taken in view of the attached drawings.

DESCRIPTION OF THE PREFERRED EMBODIMENTS

The diesel fuel heater apparatus according to the present invention, how it operates and how it differs from prior art devices can perhaps be best explained and understood by reference to the drawings.

Figure 1:
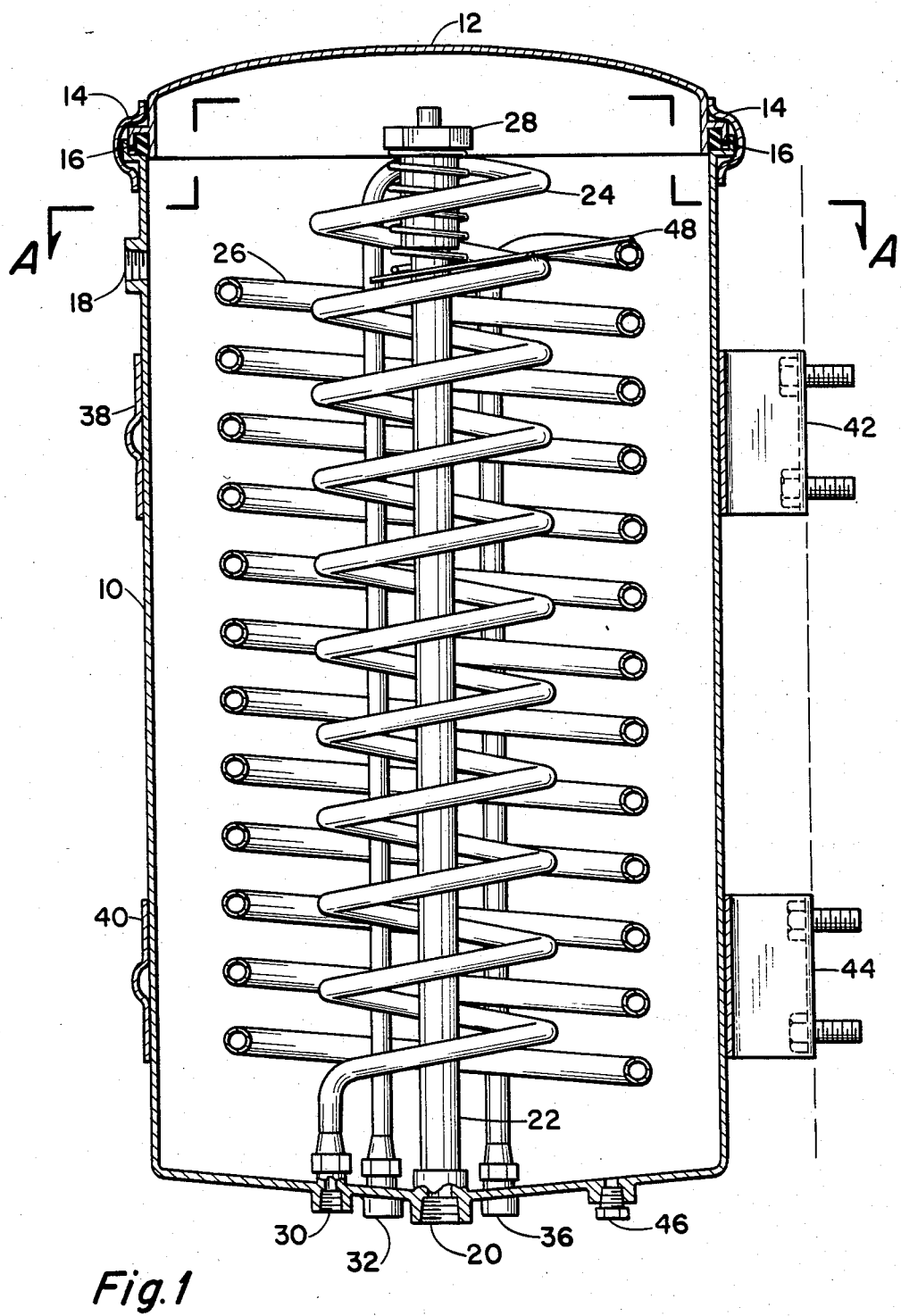
FIG. 1 is a cross sectional side view of a diesel fuel heater according to the present invention.

FIG. 1 is a cross sectional view of one embodiment of the present invention. As illustrated, the apparatus is a cylindrical cannister or container 10 with top lid 12. The lid 12 is held to container 10 by a compression strap 14 (also see FIG. 4). The presence of a rubber gasket 16 under compression from strap 14 makes a tight seal between top 12 and container 10 during operation. Container 10 is further equipped with a threaded oil inlet 18 and a threaded oil outlet 20. The oil outlet 20 is further provided with a vertical tube 22 which rises within the container 10 to a level above the internal helically coiled heat exchangers 24 and 26. At the top of the tube 22 is a flow regulator 28, the function of which will be discussed later.

Figure 2:
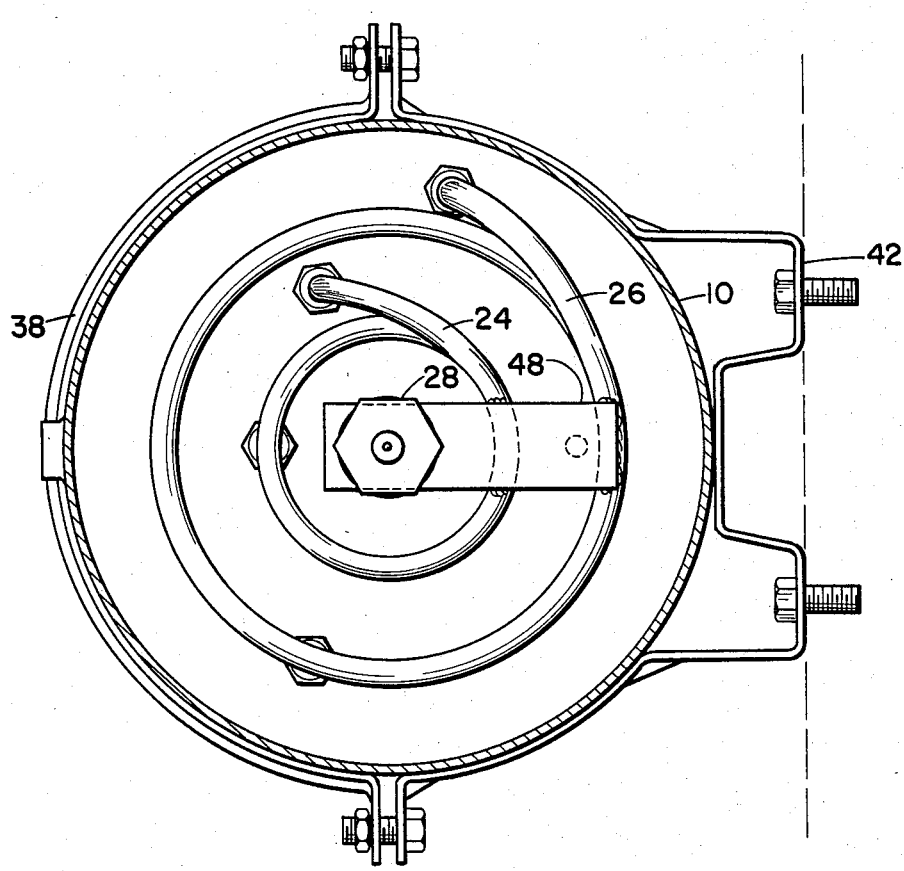
FIG. 2 is a partial cross sectional top view of the diesel fuel heater of FIG. 1 as seen through line A—A.

As can be seen in FIG. 2, the heat exchanger coils 24 and 26 are essentially a pair of independent concentrically spiralled coil tubings. The inner smaller diameter coil 24 is connected at the base of container 10 to a diesel fuel inlet 30 and to a fuel outlet 32. Similarly, the larger diameter coil 26 is connected to a fuel inlet 34 (see FIG. 3) and a fuel outlet 36.

In operation, the hot oil from the crankcase enters container 10 through oil inlet 18 filling the container with hot oil to a level in excess of the height of coils 24 and 26. Thus, the opening 18 is plumbed or connected to an appropriate hot oil source by tubing or hoses (not shown). The source of the hot crankcase oil is preferably the outlet to the oil filter but in principle can be any equivalent source associated with the lubricating system of the engine. During operation the oil enters opening 18 and exits through the oil flow means 28 and tube 22 to oil outlet 20. Again, the outlet 20 will be plumbed or connected to the oil system of the engine by appropriate hoses or tubing (not shown). The relative position of the returning oil is usually dependent upon the specific source of hot oil. Preferably, the oil passes through the oil filter, then to the fuel heater and then back to the lubricating inlet port of the engine. This has the added advantage of maintaining lower oil temperatures particularly during hot weather. However, the oil can return, in principle, to any location in the overall lubricating system of the engine, including the crankcase.

The diesel fuel from the fuel tank, via fuel lines not shown, enters fuel inlet 34 (see FIG. 3) and circulates essentially unobstructed through the interior of helical coil 26 within container 10 before exiting via fuel outlet 36. During passage through the heat exchanger coil 26, the temperature of the fuel will rise because of the indirect liquid/liquid contact between the cold fuel and the hot crankcase oil. Similarly, the return (recycle) fuel line from the injection pump (i.e., the excess diesel fuel being pumped by the fuel pump) will be connected to the fuel inlet 30. Thus, the returning fuel will pass through the coil 24 and be reheated by additional thermal contact with the hot oil in the fuel heater. Upon exiting through fuel outlet 32 the fuel is returned to the fuel tank. In this manner, the entire fuel system including the fuel tank will be heated. This is particularly useful in preventing paraffinic deposit formation during severe cold weather.

As further illustrated in the figures, the cylindrical container 10 is circumferentially held by a pair of mounting brackets 38 and 40. The mounting surfaces 42 and 44 can easily be bolted directly to the tractor of a conventional diesel truck or the like. As such, this preferred embodiment represents a particularly useful after market add-on unit for the trucking industry. Of course, the apparatus can be readily adapted to other after market products including by way of example, but not limited thereto, stationary diesel engine power plants, various farm implements and tractors, the diesel automobile, and the like. The device can be easily integrated into the original manufacturing of essentially any diesel engine driven piece of equipment and as such, it can be an integral part of other standard components, such as a fuel heater/oil filter combination unit. Also as illustrated, the container can be advantageously equipped with a drain plug 46 for ease of cleaning out the unit. And an internal brace 48 can be provided. This brace 48 rigidly interconnects the coils 24 and 26 and rests against the central tube 22 such as to reduce vibration and relative internal motion.

The fuel heater according to the present invention can be made out of essentially any conventional material compatible with hot oil and fuel as well known in the art. The heat exchanger element can also be essentially any type of liquid/liquid contacting element as commonly practiced in the heat exchanger art. The role of the two fuel streams and hot oil can be interchanged relative to which occupies the interior of the container and which is circulated through the heat exchanger element. The respective volumes of the various elements can be adjusted according to the heat transfer requirements of a particular application. It is further contemplated that the entire device can be made an integral unit within the fuel tank, thus accomplishing the desired results. The relative positions of the respective inlets and outlets can be readily adjusted according to the particular dimensions and requirements of the engine and vehicle to which the fuel heater is to be attached. Thus for example, the oil inlet 18 (or essentially any other inlet/outlet) can be repositioned to the bottom of the container to insure laminar flow and thermal contact with the coils.

Having thus described the invention with a certain degree of particularity, it is manifest that may changes can be made in the details of construction and the arrangement of components without departing from the spirit and scope of this disclosure. Therefore, it is to be understood that the invention is not limited to the embodiments set forth herein for the purposes of exemplification, but is to be limited only by the scope of the attached claims, including a full range of equivalents to which each element thereof is entitled.

I claim:

1. In a diesel engine containing a fuel tank with diesel fuel and crankcase with oil, the specific improvement consisting of an apparatus to heat fuel comprising:
    (a) a closed container equipped with an oil inlet and oil outlet and adapted to circulate hot crankcase oil from the engine through the interior of said closed container wherein said closed container is an essentially vertical cannister with removable lid;
    (b) a first heat exchanger means comprising essentially vertical concentric coils of a first tubing wherein said first heat exchanger means is within said closed container attached to a separate inlet and outlet and adapted to circulate diesel fuel coming from the fuel tank and going to the engine in indirect liquid/liquid contact with said hot crankcase oil within said closed container thus heating said fuel before combustion; and
    (c) a second heat exchanger means comprising essentially vertical concentric coils of a second tubing within said closed container attached to another separate inlet and outlet and adapted to circulate excess diesel fuel, recycled from the engine and going to the fuel tank, in indirect liquid/liquid contact with said hot crancase oil within said closed container thus heating said fuel being returned to the fuel tank and wherein said oil outlet further comprises a vertical tube within said container which rises within said container to a level above the top of said coils and terminates in a means to control the rate of oil flow through the container during operation of the engine.

2. An apparatus of claim 1 which is further adapted to be attached to a diesel powered vehicle as an essentially bolt-on after market product.

3. In a diesel engine containing a fuel tank with diesel fuel and crankcase with oil, the specific improvement consisting of an apparatus to heat fuel comprising:
    (a) a closed container equipped with an oil inlet and oil outlet and adapted to circulate hot crankcase oil from the engine through the interior of said closed container;
    (b) a first heat exchanger means within said closed container attached to a separate inlet and outlet and adapted to circulate diesel fuel coming from the fuel tank and going to the engine in indirect liquid/liquid contact with said hot crankcase oil within said closed container thus heating said fuel before combustion;

(c) a second heat exchanger means within said closed container attached to another separate inlet and outlet and adapted to circulate excess diesel fuel, recycled from the engine and going to the fuel tank, in indirect liquid/liquid contact with said hot crankcase oil within said closed container thus heating said fuel being returned to the fuel tank.

(d) a vertical tube attached to said oil outlet within said container which rises within said container to a level above the top of said first and second heat exchangers and terminates in a means to control the rate of oil flow through the container during operation of the engine.

4. An apparatus of claim 3 wherein said first and second heat exchanger means are concentric coils of tubing.

* * * * *